US009934574B2

(12) United States Patent
Grossinger et al.

(10) Patent No.: US 9,934,574 B2
(45) Date of Patent: Apr. 3, 2018

(54) USING INTENSITY VARIATIONS IN A LIGHT PATTERN FOR DEPTH MAPPING OF OBJECTS IN A VOLUME

(71) Applicant: Facebook, Inc., Menlo Park, CA (US)

(72) Inventors: Nadav Grossinger, Karmei Yosef (IL); Nitay Romano, Geva Binyamin (IL)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/052,659

(22) Filed: Feb. 24, 2016

(65) Prior Publication Data
US 2016/0253812 A1 Sep. 1, 2016

Related U.S. Application Data

(60) Provisional application No. 62/120,500, filed on Feb. 25, 2015.

(51) Int. Cl.
G01B 11/14 (2006.01)
G06T 7/00 (2017.01)
G01B 11/22 (2006.01)
G06K 9/00 (2006.01)
G06T 19/00 (2011.01)
G01B 11/25 (2006.01)
G06T 7/521 (2017.01)
G06K 9/20 (2006.01)

(52) U.S. Cl.
CPC ............ G06T 7/0057 (2013.01); G01B 11/14 (2013.01); G01B 11/22 (2013.01); G01B 11/25 (2013.01); G06K 9/00335 (2013.01); G06K 9/00355 (2013.01); G06K 9/00362 (2013.01); G06K 9/00375 (2013.01); G06K 9/2036 (2013.01); G06T 7/521 (2017.01); G06T 19/006 (2013.01); G06T 2207/10028 (2013.01); G06T 2207/30196 (2013.01)

(58) Field of Classification Search
CPC ......... G01B 11/14; G01B 11/22; G01B 11/25; G06K 9/00335; G06K 9/00362; G06K 9/00355; G06K 9/00375; G06K 9/2036; G06T 19/006; G06T 2207/10028; G06T 2207/30196; G06T 7/0057; G06T 7/0026; G06T 7/008
USPC ................................. 356/614–640, 402–408
See application file for complete search history.

(56) References Cited

U.S. PATENT DOCUMENTS

| 2009/0189858 | A1 | 7/2009 | Lev et al. |
| 2011/0025827 | A1 | 2/2011 | Shpunt et al. |
| 2011/0158508 | A1 | 6/2011 | Shpunt et al. |
| 2013/0131836 | A1 | 5/2013 | Katz et al. |
| 2014/0267701 | A1* | 9/2014 | Aviv ............... G01C 11/025 348/136 |
| 2015/0042680 | A1 | 2/2015 | Grossinger et al. |

OTHER PUBLICATIONS

PCT International Search Report, PCT Application No. PCT/US2016/019375, dated May 30, 2016, 14 pages.

* cited by examiner

Primary Examiner — Tri T Ton
(74) Attorney, Agent, or Firm — Fenwick & West LLP

(57) ABSTRACT

To determine depth of an object within a volume, structured light is projected into the volume. The structured light comprises a pattern over which intensity of the light varies. A sensor detects light from the volume and uses variations in intensity of the detected light to correlate the detected light with the pattern. Based on the correlation, depth of objects within the volume is determined.

18 Claims, 18 Drawing Sheets

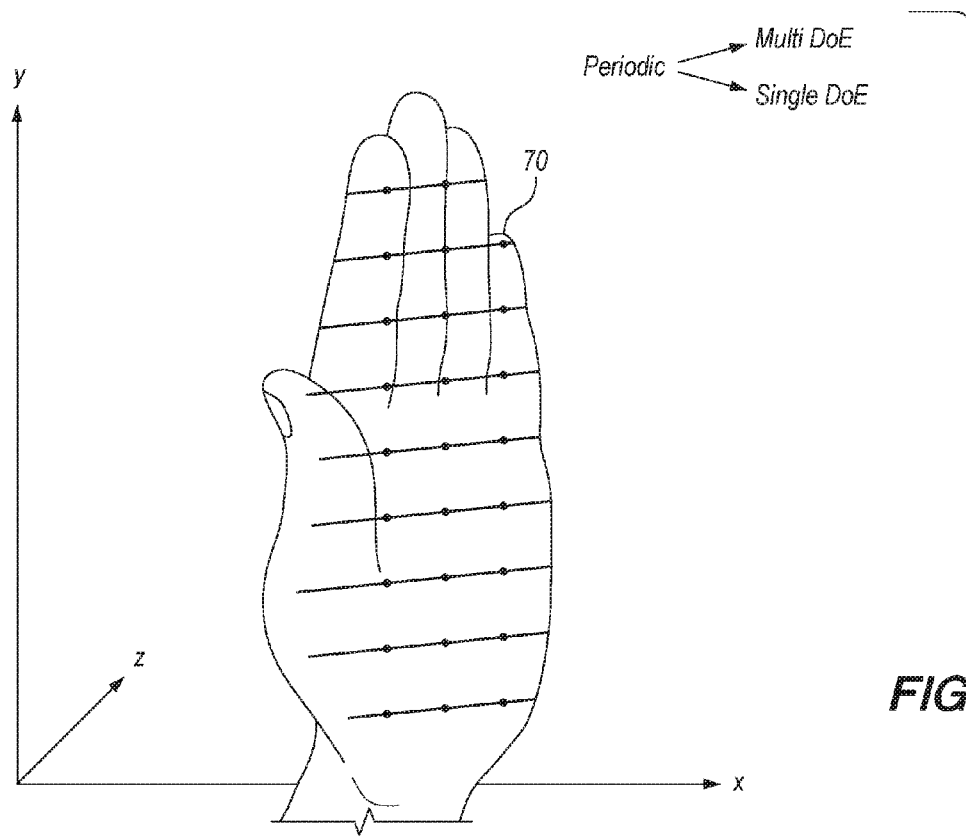
FIG. 13
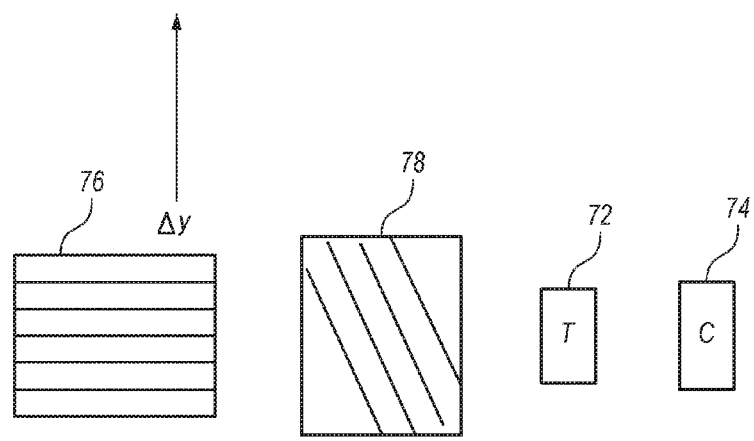

USING INTENSITY VARIATIONS IN A LIGHT PATTERN FOR DEPTH MAPPING OF OBJECTS IN A VOLUME

CROSS REFERENCE TO RELATED APPLICATIONS

This application claims the benefit of U.S. Provisional Application No. 62/120,500, filed Feb. 25, 2015, which is incorporated by reference in its entirety.

BACKGROUND

This disclosure relates generally to depth mapping and, more particularly, to a method of depth mapping using optical projections into a volume, allowing detection and tracking of an object in three dimensions Various methods allow users to remotely control certain devices. For example, predefined gestures or postures of a user's body parts (e.g., arms, legs) may control a device. In methods using gestures or postures for device control, a gesture is identified when a user's body part aligns with a specified position, and a computer or other device performs a function or performs an action corresponding to the identified gesture.

In some embodiments, gestures by a user are identified by capturing images or video of the user via an image capture device and analyzing multiple pixels in the images or in the video data. Conventional gesture detection methods analyze a pixel in an image by comparing the pixel's color values with color values of other pixels in proximity to the pixel. Hence, these conventional methods are dependent on a significant difference in color values between a body part of the user and objects in the background of the image.

Other methods for gesture detection form a skeleton model of one or more body parts of the user (e.g., a three dimensional model of a user's hand) and analyze the skeleton model to identify gestures by the user. Alternative methods for gesture detection use a three-dimensional depth map where each pixel includes a distance between a depth camera and a portion of an object corresponding to a pixel. A depth map may be calculated using a variety of methods. For example, depth mapping of scenery is done by projecting a known light pattern (i.e., a structured light pattern) onto the scenery, and an image capture device captures images of the scenery when the known light pattern is projected onto the scenery. Because the light pattern is fixed and known in advance, sub-portions or unique features of the light pattern may be identified. Distance between portions of the scenery and the image capture device (i.e., "depth" of portions of the scenery) is calculated based on shifts of identified features of the light pattern in images captured by the image capture device. However, capturing images of a light pattern projected onto scenery involves analysing larger amounts of a captured image to identify a feature of the light pattern in the captured image that can be correlated with the features of the known light pattern. Additionally, a relatively large separation between the image capture device and a projector projecting the known light pattern is necessary to provide higher-resolution depth detection by creating a larger shift of the image of the known light pattern with respect to a depth shift of an object in the scenery.

However, these conventional methods of determining a depth map are computationally expensive and do not produce results that allow accurate determination of certain objects. For example, conventional depth mapping methods do not allow accurate detection of fingers or body parts to distinguish between closely related gestures or postures.

SUMMARY

A light pattern is projected into a volume and provides identifiable intensity variations used to map depth in the volume. In some embodiments, two or more variations of the light pattern are projected into at least one dimension. For example, two intensity variations of the light pattern are projected into a vertical axis. Measuring the different variations against each other allows determination of depth information at different positions of the volume. Additionally, using different variations of the light pattern allow relative and absolute indexing of the pattern.

For example, the pattern includes multiple stripes, or lines, of light, with different stripes having unique intensity-based features when projected into the volume. From the different intensity-based features, each stripe in the pattern may be uniquely identified, allowing triangulation of individual locations in the volume from shifts in an identified stripe. This allows generation of a depth map for the area that allows gestures or postures to be identified.

In some embodiments, an object within a volume is three-dimensionally mapped by projecting a structured light pattern into the volume. The structured light pattern is a light pattern having multiple features and having a predefined structure. For example, the structured light pattern includes striping extending in a dimension with each feature being a predefined variation. For example, a feature is an intensity level. In some embodiments, the structured light pattern is formed using multiple diffractive elements. Additionally, the structured light pattern may have a variation along a dimension and an additional variation along another dimension; the additional variation varies along the dimension in some embodiments. For example, the variation or the additional variation is a cyclical intensity variation, which may be one or more of: a binary variation, a three-level variation, a four level variation, a five level variation, a six level variation, a seven level variation, and an eight level variation. Alternatively, the additional variation is a distribution of uniform peak intensities that vary along the dimension. In an embodiment, the variation is a cycle of intensities in the dimension, where the structured light pattern comprises a group of stripes in the cycle that are projected with a respective intensity. A relative index of the stripes relative to the cyclical variation may be established in some embodiments. The additional variation may comprise intensity variations along the stripes so locations of respective peak intensities for different stripes are different for different stripes in the group, and locations of the respective peak intensities may be used to obtain depth information for objects in the volume in some embodiments. In some embodiments, a light beam is projected through an optical element and an additional element to generate a structured light pattern where the optical element defines stripes along a the other dimension, while the additional optical element specifies the additional variation in a grid that has an axis offset with respect to the other dimension, providing respectively different locations of peak intensities on each stripe.

Light reflected by one or more objects in the volume is detected, with the detected light including one or more of the features. Hence, the detected light includes one or more variations of the structured light pattern. A variation of the structured light pattern in the detected light is correlated with the predefined structure of the structured light pattern, and the correlation is used to index the variation of the structured light pattern in the detected light to determine a depth of an object associated with the variation of the structured light pattern in the detected light. For example, the variation of the structured light pattern in the detected light is compared with a corresponding position in a detection image that includes objects in the volume to objects to obtain depth information for the object associated with the variation of the structured light pattern, as well as depth information for objects associated with other variations of the structured light pattern in the detected light. In some embodiments, features of the structured light pattern are orthogonally indexed according to the structured light pattern.

Depth information for objects in the volume may be used to provide three-dimensional depth mapping of various objects in the volume. In an embodiment where the structured light pattern has a variation and an additional variation, depth information for the object is determined by calculating a depth in the volume from a ratio of a local value of intensity of the structured light pattern from the variation and a locally measured peak intensity of the additional variation. If the structured light pattern has a variation along a dimension and an additional variation along another dimension, depth information about one or more objects in the volume may be determined using the variations and the additional variation.

In other embodiments, a light pattern having a variation in a dimension and an additional variation in an additional dimension is projected into a volume. For example, the variation is a cyclical intensity variation and the additional variation is a distribution of uniform peak intensities along the additional dimension that varies with the dimension. In some embodiments, the light pattern comprises stripes extending in the dimension. The variation in the dimension is projecting different stripes in the pattern with different intensities and repeating the different intensities for at least an additional group of stripes. Additionally, the additional variation may be Gaussian variations along the stripes in the pattern paving peak intensities. Object segmentation may be used to determine a relative index of the stripes relative to the cyclical variation in some embodiments. The additional variation may be generated by projecting the stripes through an optical element that defining the second variation in a grid having an axis offset with respect to the additional dimension to provide different stripes with respectively different locations of the peak intensities; the stripes in the light pattern may be formed by projecting light through an additional optical element in some embodiments At least one location in the volume reflecting the light pattern is found, and a ratio between an intensity according to the variation and an intensity according to the additional variation is determined at the location. Based on the determined ratio, a depth at the location is determined. In some embodiments, a relative index of stripes in the light pattern relative to the cyclical variation is established by segmenting objects in the volume. Locations of the respective peaks from the relative index may be used to determine to establish a depth map identifying depth information of objects in the volume.

To project a light pattern into a volume, a light source is configured to product a light beam with an intensity that varies in a direction. The light beam is projected from the light source to an optical element that is configured apply intensity features to the light beam in an additional direction that is orthogonal to the direction in which the intensity of the light beam varies; hence, light output from the optical element has varying intensity features. In some embodiments, an additional optical element is configured to apply additional intensity features to the light beam that overly intensity features applied by the optical element. For example, the additional optical element applies the additional intensity features in a grid layout. The additional optical element is offset with respect to the direction, so the additional intensity features are at different locations of different portions of a light pattern. In some embodiments, the light pattern comprises multiple stripes, with the additional intensity features at different locations in each stripe.

In some embodiments, a projector is configured to project a light pattern into a volume. The light pattern comprises a cyclical intensity variation along a dimension and an additional variation in an additional dimension that comprises distributed peak intensities of uniform brightness. A collimator is configured to collimate the projected light beam. Additionally, a detector is configured to obtaining an image of the light pattern, and a depth calculator is configured to calculate depths at locations in the light pattern, where a depth at a location in the light pattern is determined from a ratio between an intensity of the light pattern at the location due to the cyclical intensity variation and a peak intensity of the light pattern at the location from the distributed peak intensity of uniform brightness.

The projector may comprise an optical element configured to superimpose parallel stripes in a first direction onto a source beam, and an additional optical element, offset with respect to the direction, configured to generate notations to be superimposed on the parallel stripes, the notations provided in a grid layout. Offsetting the additional optical element with respect to the direction causes the notations to be at different locations in each stripe. A plurality of light sources are configured to produce the source beam for projection through the optical element and the additional optical into the volume, with the light sources powered to vary in intensity in a direction orthogonal to the direction.

In other embodiments, an apparatus for determining depth information of a volume includes a light source configured to produce a pattern of featured light for projecting into the volume. An optical element is configured to apply a signature to each feature of the light projected into the volume. In some embodiments, a unique signature is applied to each feature. As another example, a signature is at least one cyclic variation applied over groups of features. Additionally a signature may comprise a cyclic variation and an additional cyclic variation applied over the features. The cyclic variation and the additional cyclic variation may have different phases in some embodiments. Additionally, a camera is configured to detect light from the volume, while a processor is coupled to the camera and is configured to calculate depth information within the volume using positions of the features identified from the light detected by the camera.

BRIEF DESCRIPTION OF THE DRAWINGS

FIG. 13 is a conceptual diagram illustrating use of notations to provide stripes in a light pattern with signatures, in accordance with an embodiment.

Figure 1A:
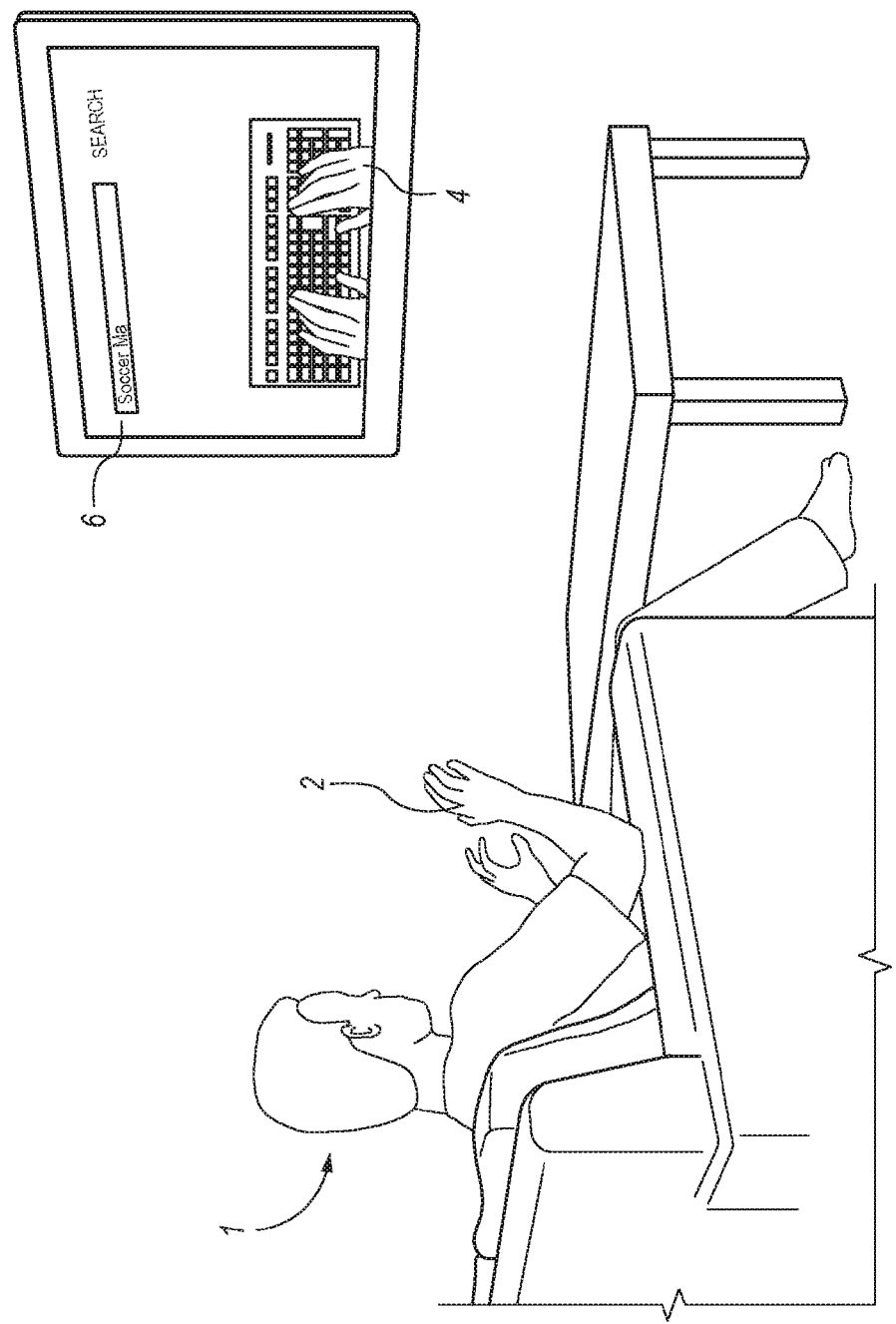
FIG. 1A is a simplified schematic diagram showing the use of hand gestures to enter text at a computer interface involving a soft keyboard shown on a screen, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Various embodiments allow depth mapping of a volume using optical projections into the volume, allowing generation of a skeletal model of a user, implementation of a user interface for controlling a device (e.g., a computer, a virtual reality system, etc.). Patterned light is protected into the volume and used to obtain a depth map of the volume, from which objects or movement of objects is identified, allowing identification or postures or gestures. The disclosed embodiments may be used by any device tracking movements or gestures of a body or of an object.

A light pattern, also referred to as "structured light," is projected into a volume. A camera or other detector detects light from the volume that includes a distorted version of the original structured light that includes shifts and other distortions caused by depth. The shifts or other distortions are identified by comparing the distorted version of the structured light that is captured to the original structured light or by identifying parts of the structured light and used to generate a depth map of the volume. Hence, the depth map may be obtained by correlating the distorted version of the structured light to the structured light. Features included in the structured light may be individualized to aid in correlation between the captured distorted version of the structured light and the structured light, allowing a sequence of adjusted features to determine correlation between the captured distorted version of the structured light and the structured light. The depth map obtained from correlating the distorted version of the structured light to the structured light allows depths to be determined for objects in the volume. In various embodiments, the correlation between the distorted version of the structured light and the structured light is based on the overall structured light, based on individual features of the structured light, or based on individual features of and parts of the structured light in various embodiments.

In one embodiment, the structured light (or "light pattern") includes one or more different variations in orthogonal directions, allowing more accurate identification of specific features of the structured light for depth mapping. The variations may be intensity variations and may give unique signatures different parts of the features of the structured light. Alternatively, the variations may be cyclic, with different variations having different phases, to allow identification of unique features reducing computing resources used to identify unique features. If two or more variations are included in the structured light, different variations may be measured against each other to give depths at different positions.

For example, features of the structured light are stripes in one dimension. A unique or a cyclically unique signature is applied to each stripe in a dimension, such as along a vertical axis. Based on shifting of each stripe in a captured distorted version of the structured light relative to positions of corresponding stripes in the original structured light, a depth map may be determined. In some embodiments, a ratio between intensity of a stripe and peak intensity of the stripe is also used when determining the depth map. To determine shifting of the stripes, different stripes in the structured light are individually identified based on the signature applied to the different stripes. For example, each stripe is identified based on a signature applied to each stripe. For example, if a signature is an intensity variation along stripes, each stripe may have differing intensities from a weak intensity, a medium intensity, and a strong intensity; for example, a detected stripe includes a weak intensity, a strong intensity, and a medium intensity in that order, and a particular location in the structured light includes a strip having the order of the weak intensity, the strong intensity, and the medium intensity, allowing indexing of the detected stripe. However, in other embodiments, any suitable features may be included in the structured light. For example, in another embodiment the structured light includes squares having differing intensities.

In some embodiments, two intensity variations of the structured light are used. The two intensity variations may be cyclical, for example based on available gray levels that may be set for individual pixels to more efficiently use electronic and optical components. If the two cyclical variations are out of phase, a relatively large overall cycle of the variations may be provided. Hence, at least two variations of the structured light allow absolute indexing of the structured light. For example, the structured light (or "light pattern") comprises parallel stripes, which may vary in a base intensity in a cycle along a direction (e.g., in a direction orthogonal to orientation of the stripes). Additionally, each stripe may include notations along a direction in which a strip is oriented. Notations are arranged differently on different stripes to allow individual stripes or clusters of stripes to be identified and indexed. In some embodiments, the notations have a peak intensity that is kept constant. Different intensities and different notation distributions on different stripes allow identification of individual stripes, as well as identification of individual sectors of a strip, improving depth mapping accuracy. In some embodiments, the notations are constructed from Gaussian brightness distributions. While intensities appear to dim as distance between a light source and a detector increases, decreased detected intensity of stripes provides an indication of depth; however, absolute brightness also depends on the surface from which light was reflected, making it unable to accurately determine depth without additional information. However, a ratio between a base intensity of a stripe and a peak intensity of the strip allows for more accurate depth calculation, particularly when combined with segmentation or triangulation results.

A light pattern is projected having one or more distinctive intensity variations, with each intensity variation having a unique intensity alteration function over distance. For example, the light pattern comprises continuous stripes with intensity along a stripe having a Gaussian distance. While the intensity of the stripe linearly degrades as distance between a source of the light pattern increases (e.g., as a horizontal distance to the source of the light pattern increases when the source of the light pattern is horizontally oriented), the peak intensity of the stripe when captured by a detector remains constant. Hence, a distance to an object reflecting the light pattern to the detector (e.g., a camera) may be extracted by comparing the peak intensity of the stripe to the intensity of the stripe.

Multiple intensity functions vary intensity of the light pattern over distance may be provided by creating multiple phase functions differently propagate over distance, which create different intensity ratios over different ranges. For example, an intensity function creates the stripe features from input light and an additional intensity function creates the Gaussian distribution of intensity along the stripes. In general, intensity of light reflected from an object is inversely proportional to a square of a distance between the object and a detector (i.e., as $1/z^2$, where z is the distance between the object and the sensor), as the reflected light is spherically spread back to the detector. Because a stripe is collimated along a single axis and physical coverage of each pixel in the detector is angular, the collimated stripe is captured by fewer pixels on the detector, which increases the intensity of the stripe. Hence, the intensity of a stripe is reduced by $z/z^2$, or $1/z$, where z is the distance between the object reflecting the stripe and the detector.

Using diffractive optics, the additional intensity function changing intensity along a stripe in the light pattern may be created using an independent phase function, allowing the intensities along the stripe to be radially collimated Gaussians. Therefore, pixels in a detector sampling the Gaussian intensity distribution is reduced along axes parallel to and perpendicular to the detector (e.g., along both a horizontal and a vertical axis if the detector is horizontally oriented), resulting in a peak intensity at a location of a stripe of $z^2/z^2$, where z is a distance between an object reflecting the stripe, which is a constant. The ratio of the intensity of peak intensity of the stripe to the stripe's brightness changes as a distance between an object reflecting the stripe and the detector changes as the intensity of the stripe changes based on 1/z, while the peak intensity remains constant. As the nature of the reflective surface of the object reflecting the strip equally affects both the intensity of the stripe and the peak intensity of the stripe the ratio, unlike the absolute intensities, is not substantially affected.

Figure 1B:
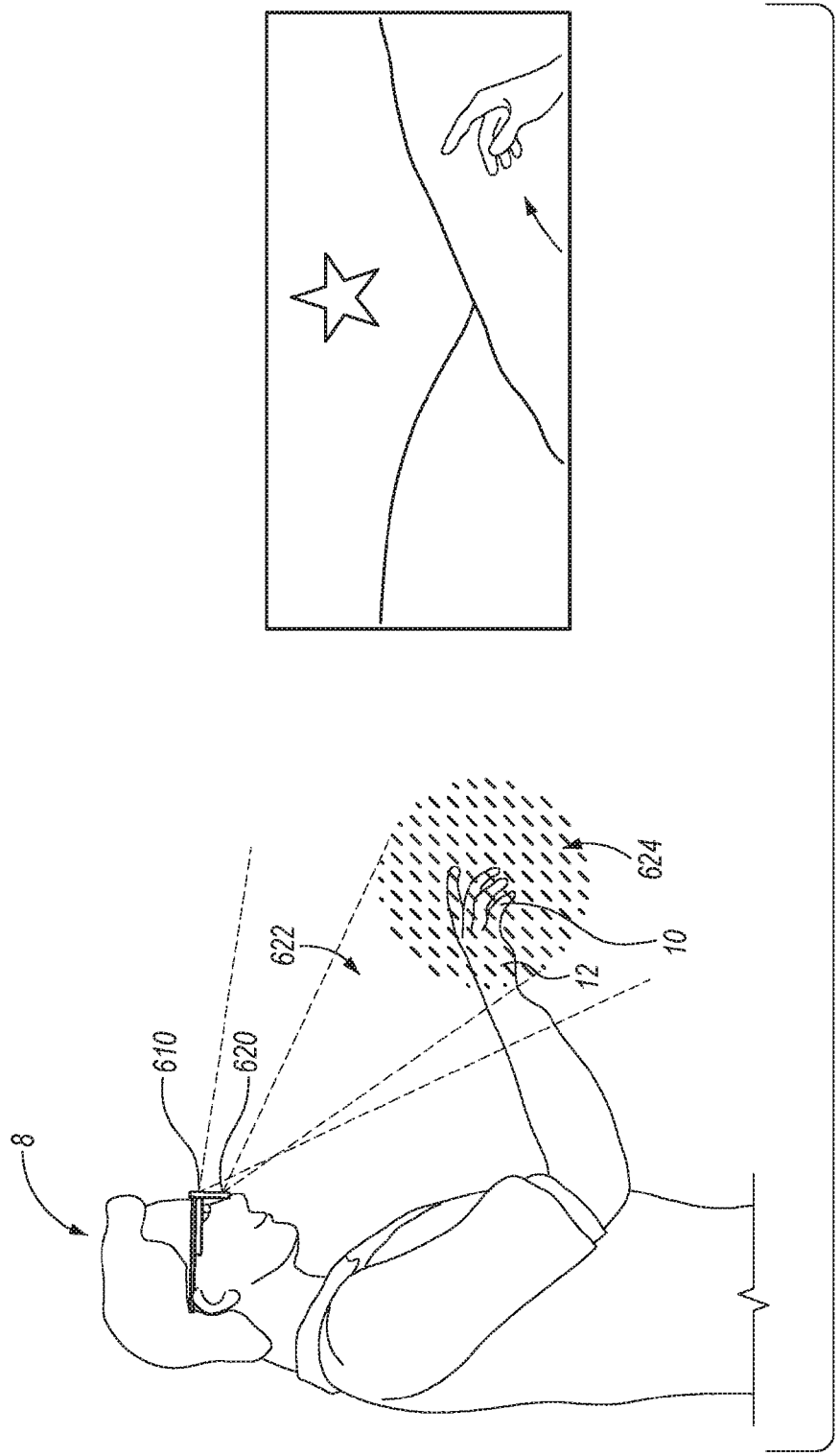
FIG. 1B illustrates a virtual reality system, in accordance with an embodiment.
Figure 1C:
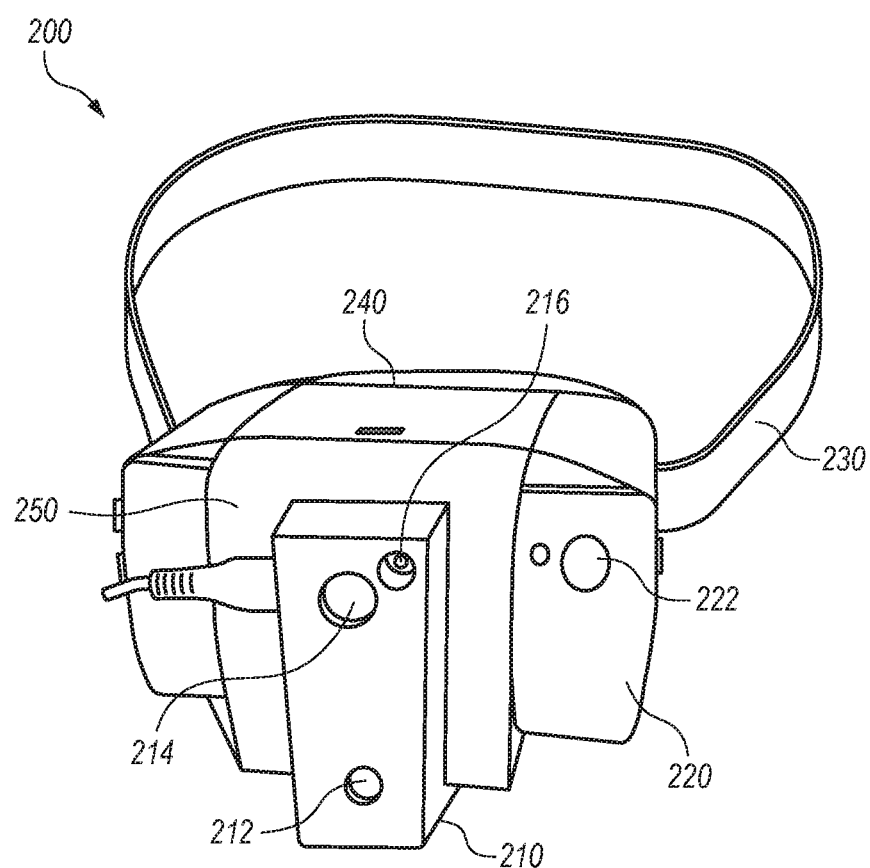
FIG. 1C illustrates a virtual reality apparatus, in accordance with an embodiment

Referring now to the drawings, FIG. 1A is a conceptual diagram of a computer user 1 performing gestures with the hands 2 of the computer user 1 to type on a soft keyboard 4 presented on a screen 6. To detect the gestures, structured light (also referred to as a "light pattern") may be projected onto the hands 2, with light reflected from the hands 2 is detected. Triangulating the detected structured light may allow generation of a depth map of the volume including the hands 2. FIG. 1B is a conceptual diagram of a user 8 of a virtual reality system. In the example of FIG. 1B the user wears virtual reality glasses and controls the virtual reality system through gestures of hands 10 in the air. FIG. 1C illustrates a head mounting apparatus 200 for use in a virtual reality system, such as described above in conjunction with FIG. 1B. The apparatus 200 is mounted on the user's head using a head band 230 and projects an image into the user's eyes.

Figure 2:
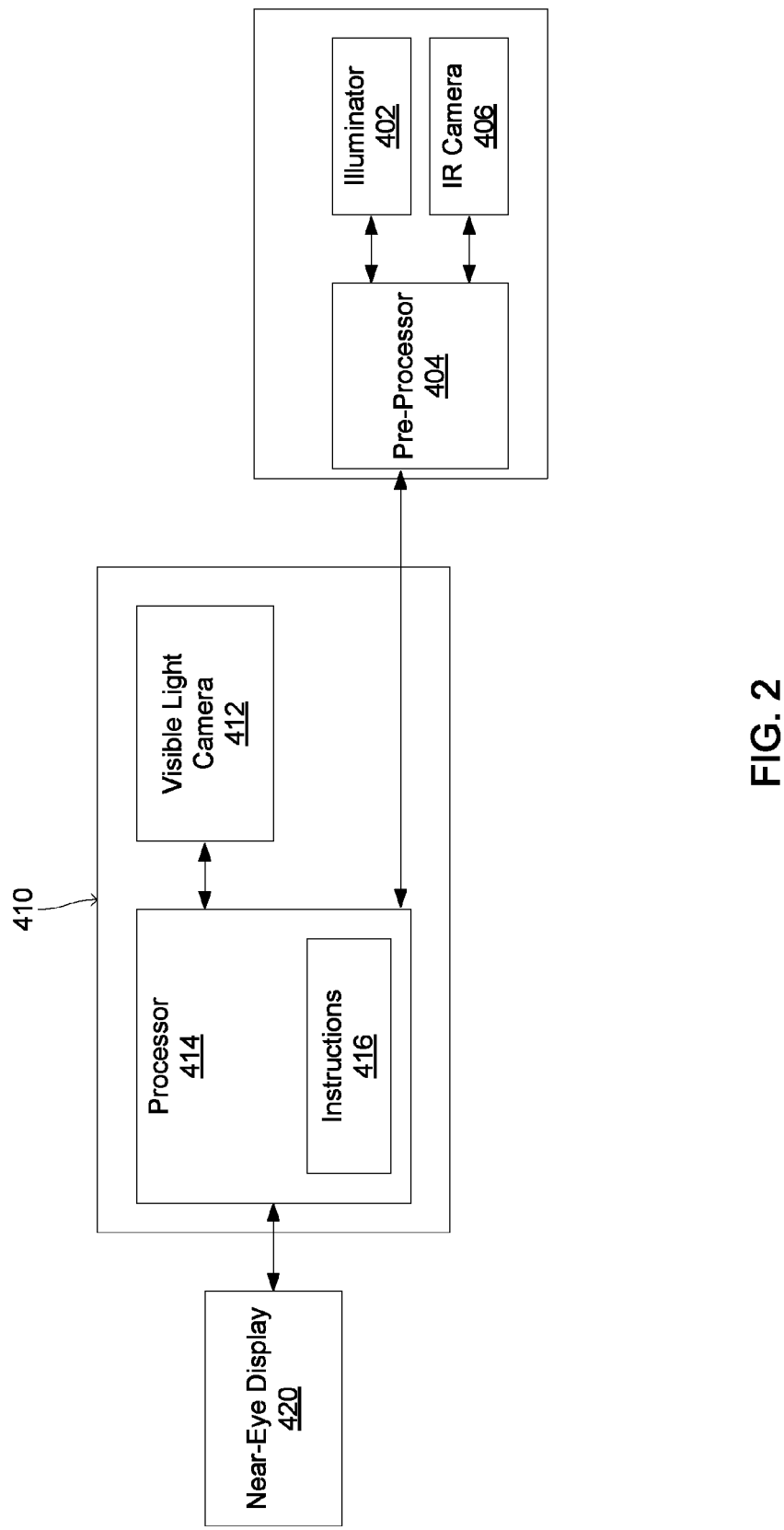
FIG. 2 is a simplified block diagram illustrating a detecting apparatus, in accordance with an embodiment.

FIG. 2 is a block diagram of an embodiment of a virtual reality apparatus, which may detect structured light in a volume. The virtual reality apparatus may also provide a virtual reality display for a user in a virtual reality system, such as the virtual reality system described in conjunction with FIGS. 1B and 1C. In the virtual reality apparatus, block 400 provides an IR light beam using an illuminator 442. Light from the illuminator 442 is detected by an IR camera 406, and the detected light is processed by preprocessor 404. Similarly, block 410 provides visible light that is detected by a visible light camera 412. A processor 414 processes visible light captured by the visible light camera 412, and also processes information from the preprocessor 404, so the processor 414 further processes detected light from the IR camera 406 after processing by the preprocessor 404. The processor 414 also executes instructions 416 stored in a memory to provide various functionality. Additionally, the virtual reality apparatus includes a near eye display 420 configured to provide a virtual reality display to the user.

Figure 3:
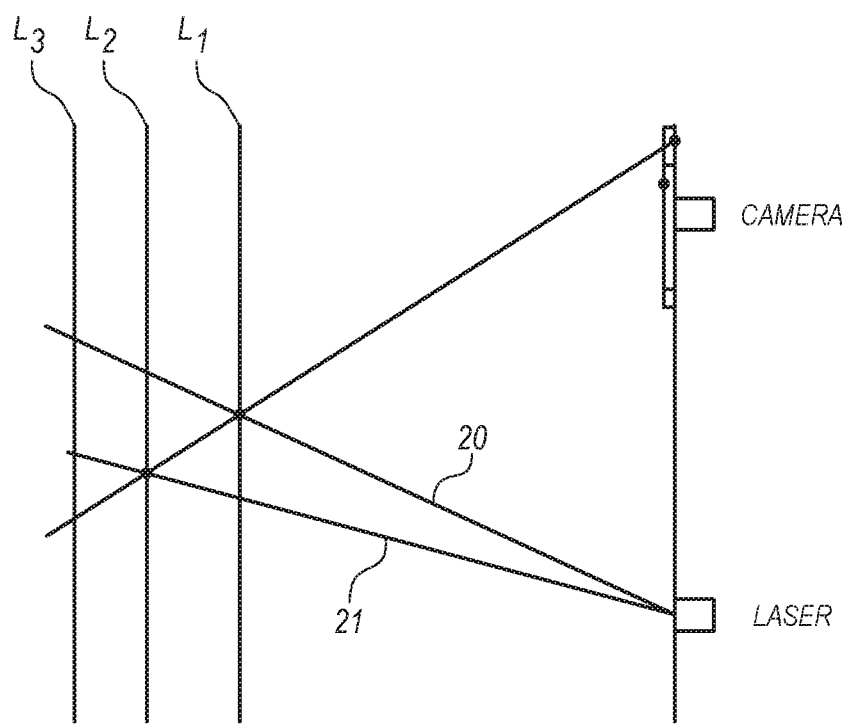
FIG. 3 is a simplified line diagram illustrating translation of detected angles from an identified light pattern into depth information, in accordance with an embodiment.

FIG. 3 shows a light source, shown as a laser 300 in FIG. 3, projecting a light pattern into a volume 305. Light from the laser 300 is reflected from objects at different depths in the volume 305, illustrated as depth Z1, depth Z2, and depth Z3 in the example of FIG. 3. A camera 310, or another image capture device, detects light from the light pattern reflected from the objects. A difference between light reaching the camera 310 at the same angle from depth Z1 and from depth Z2 is a different part of the light pattern. Thus, detection of a part of the pattern allows a depth of an object from which light comprising the part of the pattern was reflected.

Figure 4:
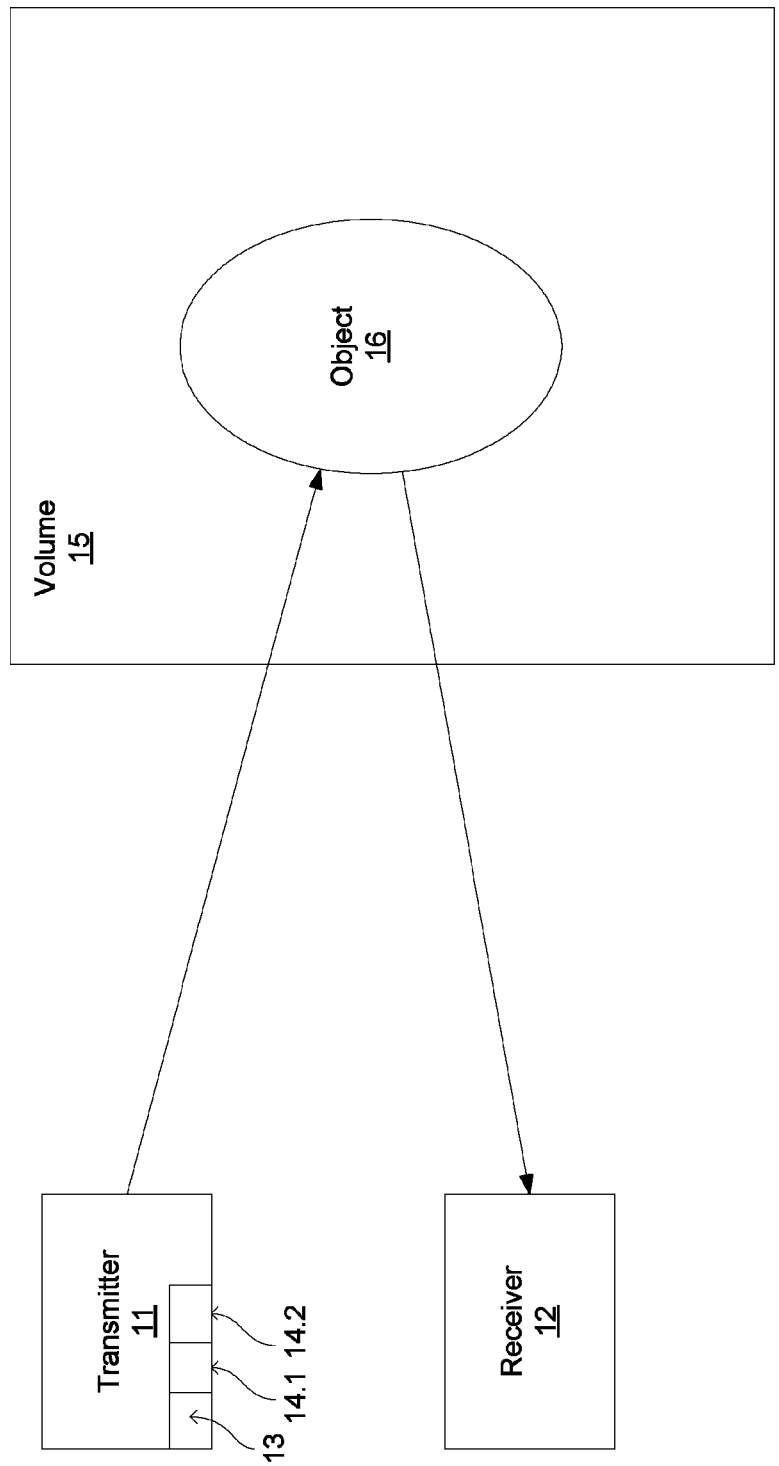
FIG. 4 is a simplified block diagram showing light transmitted into a volume and reflected from an object towards a receiver, in accordance with an embodiment.

FIG. 4 is a block diagram of a transmitter 11 and a receiver 12. In various embodiments, the transmitter 11 is a laser light source 13 followed by one or more optical elements 14.1, 14.2 that form a light pattern from light transmitted by the laser light source 13. The transmitter 11 emits the resulting light pattern into a volume 15, where the light pattern is reflected by various objects in the volume 15, such as object 16. The reflected light is detected by a receiver 12 which may be a charge coupled device (CCD), a complementary metal-oxide semiconductor (CMOS) detector, or other suitable type of detector. According to one embodiment, portions of the detected light pattern are detected light patterns are analyze to determine if they are from an object of interest; for example, a segmentation process is used to determine if an object reflecting a portion of the light pattern is an object of interest. For example, an object of interest is a portion of a human body in embodiments where command gestures are identified, although anything may be an object of interest in various embodiments. However, in other embodiments, the light detected light patterns are not analyzed to determine if objects of interest reflect portions of the light pattern. Different portions of the reflected light pattern are analyzed to determine depths from which they were reflected (e.g., to determine depths of objects in the volume that reflected different portions of the reflected light pattern) Based on different depths determined from different portions of the reflected light pattern, a depth map is generated that includes depth information of various objects in the volume 15, as further described below.

Figure 5A:
FIG. 5A shows a binary light pattern, in accordance with an embodiment.
Figure 5B:
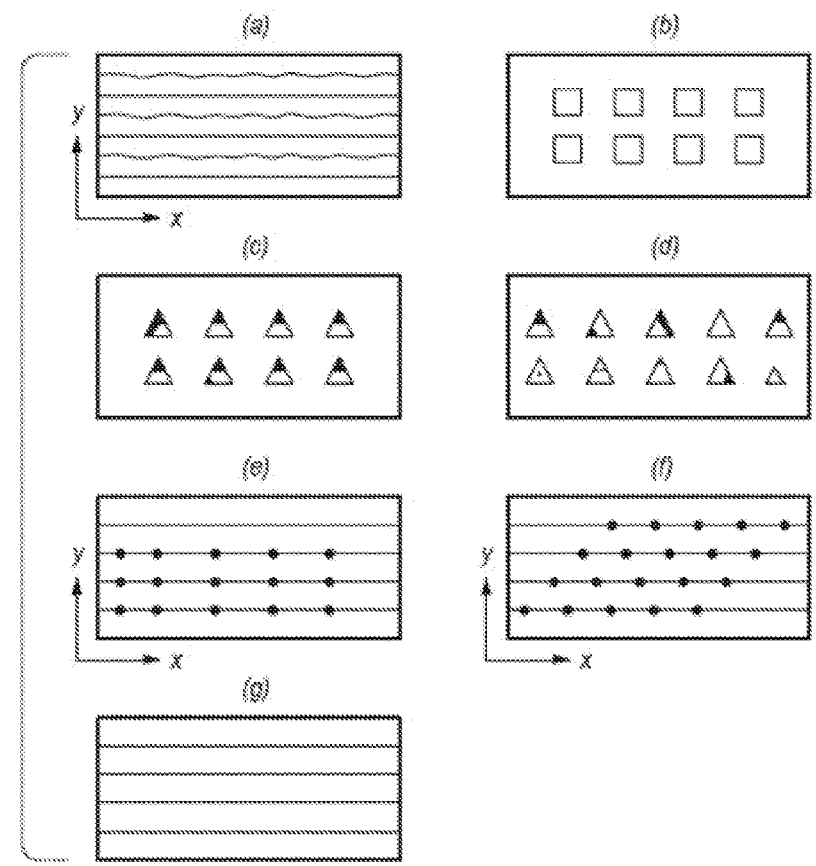
FIG. 5B shows various examples of light features, in accordance with an embodiment.

FIG. 5A is an example of a binary light pattern (also referred to as "structured light") used to detect a human. In the example of FIG. 5A, the binary light pattern comprises multiple stripes, which may be enhanced by adding signatures to different stripes. For example, signatures added to a stripe are one or more of the features shown in FIG. 5B. In one embodiment, different stripes in the binary light pattern have different intensities arranged in different patterns (a); for example, different patterns of stripes having different intensities relative to each other comprise the binary light pattern. In other embodiments, squares (b), triangles (c), (d) or other shapes may be superimposed on deferens stripes. Different shapes superimposed on stripes may include internal variations in intensity or in other characteristics as shown by the different triangles (c), (d). Signatures may be added to stripes in a regular pattern (e) or in addition to regular or irregular intensity variations (f). Irregular intensity variations along a length of a stripe (g) may be added to the stripe as a signature. In some embodiments, any combination of the signatures shown in FIG. 5B may be added to different stripes to allow different stripes to be distinguished from each other.

Figure 5C:
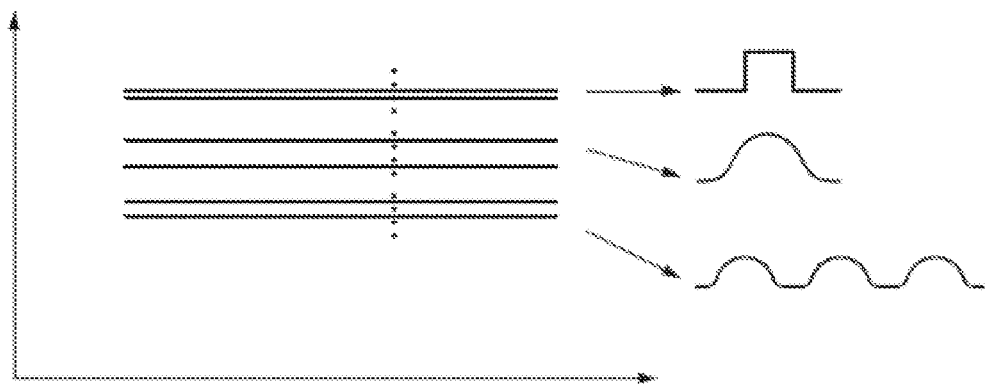
FIG. 5C shows various examples of signatures incorporated into a light pattern including stripes of light, in accordance with an embodiment.

It is noted that the signatures, or features, may have uniform intensity or may have intensity variations in different portions of a strip. For example, a feature in different locations in the binary light pattern may have a different uniform intensity or may have different variations in intensity. FIG. 5C illustrates an example of a square intensity variation across a width of a stripe, a Gaussian intensity variation across the width of the stripe, and an irregular intensity variation across the width of the stripe.

Figure 5D:
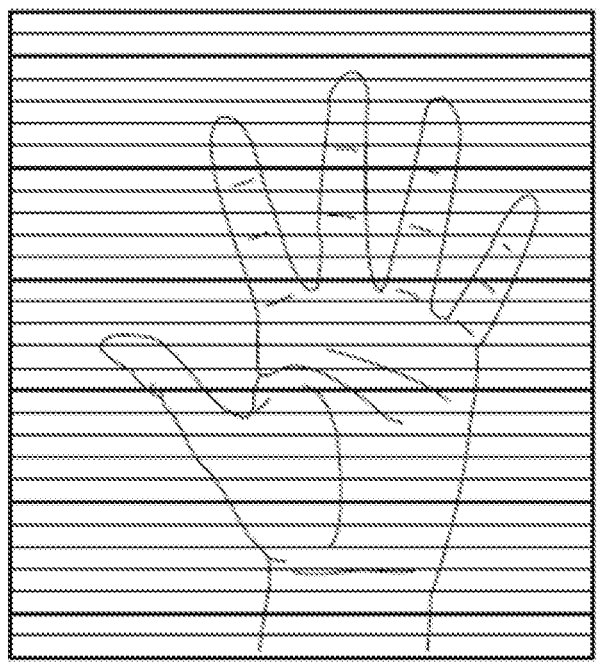
FIG. 5D is a simplified diagram showing illumination of a hand by a light pattern using intensity to provide signatures, in accordance with an embodiment.
Figure 6A:
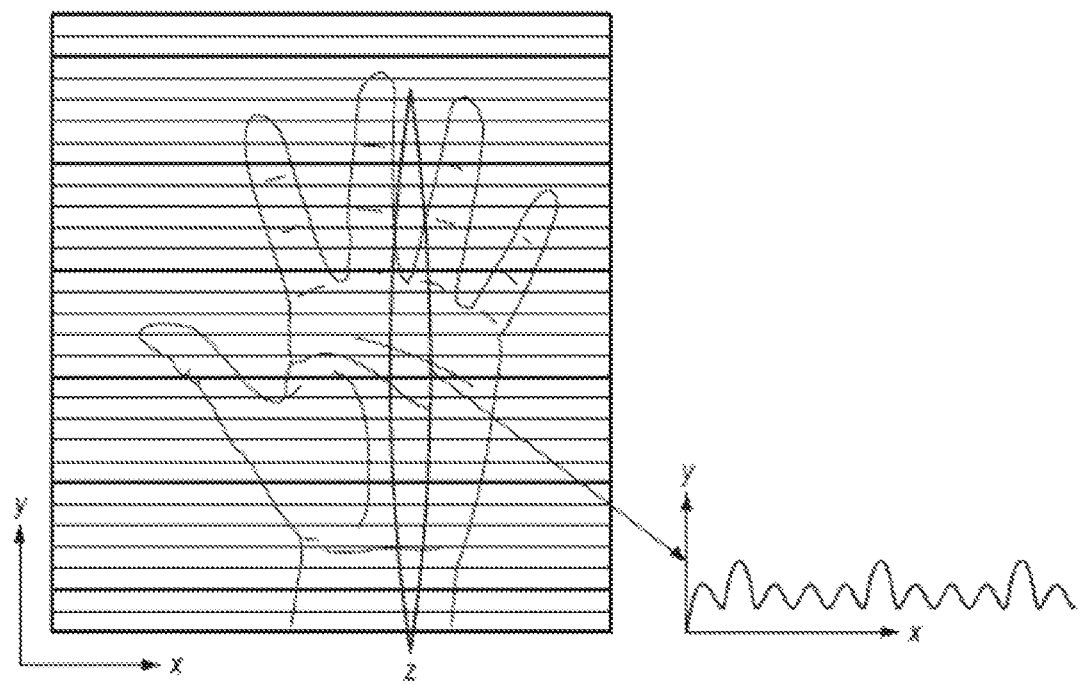
FIG. 6A illustrates illumination of a hand using a feature intensity which varies cyclically a direction, in accordance with an embodiment.
Figure 6B:
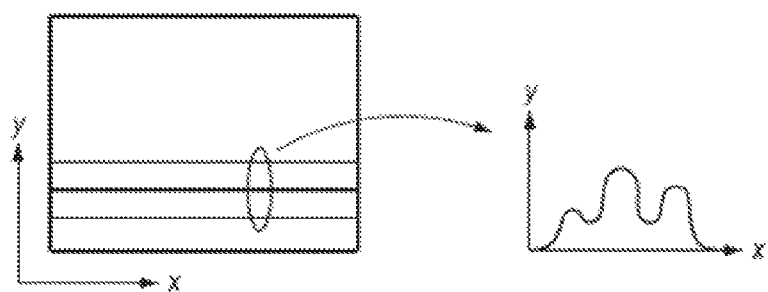
FIG. 6B shows a detail of the directional variation of FIG. 6A, in accordance with an embodiment.

FIG. 5D is an example of a light pattern comprising multiple stripes having different intensities projected onto a hand. The different intensities provide references within the pattern. FIG. 6A shows another example of a light pattern having an alternative variation in intensity between different stripes than the example shown in FIG. 5D. Additionally, FIG. 6B shows an alternative variation of intensities across a width of a stripe in the light pattern.

Figure 7:
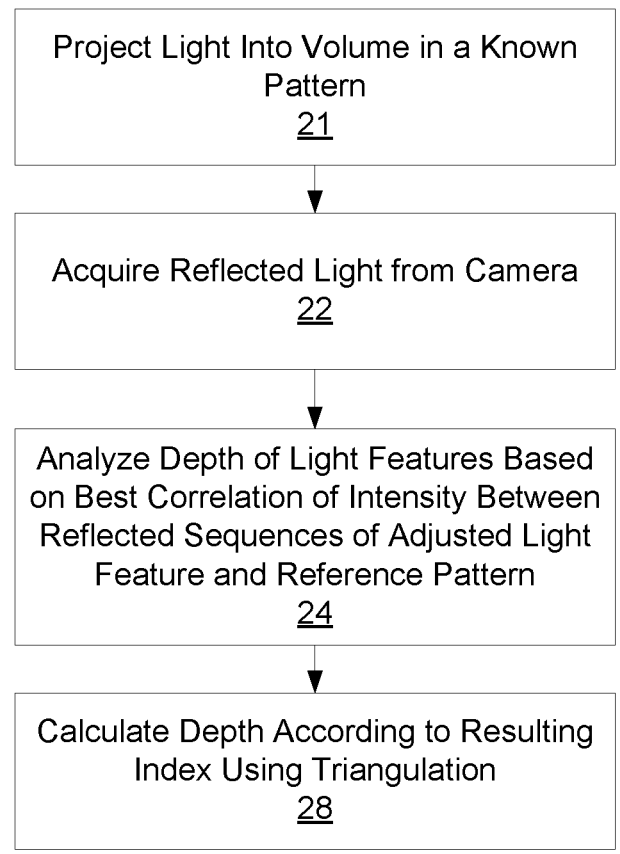
FIG. 7 is a flowchart illustrating a method for calculating depth in a volume, in accordance with an embodiment.

FIG. 7 is a flowchart of one embodiment of a method for calculating depth in a volume. In other embodiments, the method may include different or additional steps than those described in conjunction with FIG. 7. Additionally, in some embodiments, steps of the method may be performed in different orders than the order described in conjunction with FIG. 7.

Initially, light is projected 21 into the volume. In one embodiment, the projected light comprises a light pattern having multiple stripes parallel to each other in a direction, with different stripes having different intensities or different brightnesses; intensity or brightness of different stripes may vary according to a cycle repeated along a direction orthogonal to the direction in which the multiple stripes are parallel to each other, as further described above in conjunction with FIG. 5B. However, in other embodiments, the light pattern of the projected light includes any suitable feature or features may be included in the light pattern of the projected light. Additionally or alternatively, each stripe may include a Gaussian intensity distribution across a width of a stripe in a direction orthogonal to the direction in which the stripes are parallel to each other or another intensity variation across the stripe in the direction orthogonal to the direction in which the stripes are parallel, such as shown in above in FIGS. 5B and 5C. The intensity variations in the direction orthogonal to the direction in which the stripes are parallel to each other are referred to herein as a "signature" or a "notation." The different intensities for different stripes allow identification of individual stripes, and the notations included on different stripes provide an additional method for identifying individual stripes (or vice versa). The variation in the notations or signatures on different stripes is not cyclical or follows a different cycle than the variation of intensities of different stripes, so a combination of an intensity of a stripe and notations on a stripe allows identification of each individual stripe. In some embodiments, the notations on different stripes may be cyclical so the notations appear differently on each stripe.

A camera or other image capture devices acquires 22 light from the light pattern reflected by objects in the volume. When the stripes from the light pattern are projected onto an object of interest, edges of the object of interest are indicated by discontinuities in the stripes, as shown in FIG. 5D. Hence, segmenting captured images of the volume allows rapid identification of objects in the volume and selection of objects of interest, such as hands and fingers, in the volume. Segmentation may also allow relative indexing of the stripes. Segmenting a captured image of the volume eliminates background objects so depth information for objects of interests rather than background objects is subsequently determined.

Features of the light pattern, stripes of the light pattern appearing across the object of interest, and absolute indexing of features of the light pattern are used to analyze 24 depth of various (e.g., each) feature of the light pattern from the light acquired 22 by the camera. Initially, indexing of the stripes of the light pattern is relative, which identifies depths within the object of interest rather than depth information relative to volume. However, the pattern of notations on particular stripes is compared to a reference pattern to identify different stripes based on the notations. An absolute index may be provided based on notations, intensities of stripes, or a combination of notations and intensities of stripes. From the absolute index, depth of the object of interest in the volume is calculated 28, as further described below.

Figure 8:
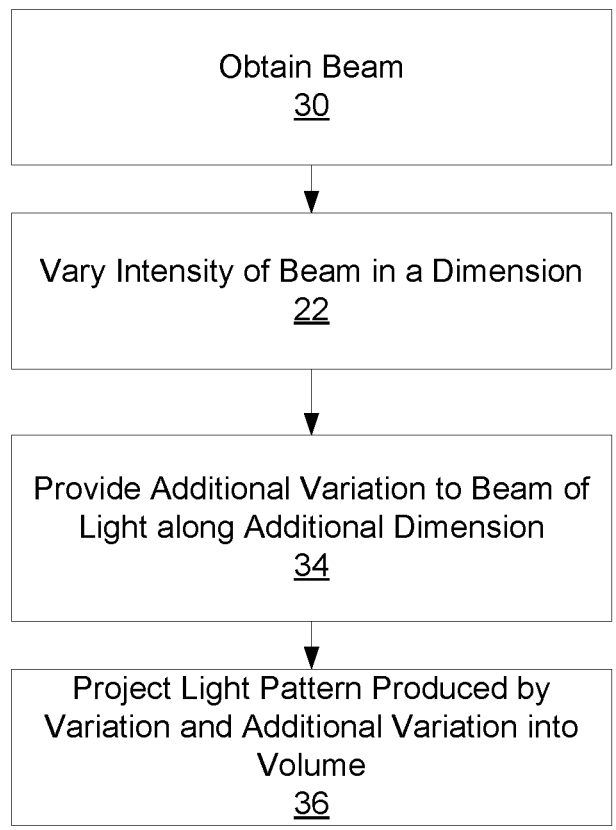
FIG. 8 is a flowchart of a method for producing a light pattern, in accordance with an embodiment.

FIG. 8 is a flowchart of a method for producing a light pattern projected into a volume. In some embodiments, the method includes different or additional steps than those described in conjunction with FIG. 8. Additionally, in some embodiments, steps of the method are performed in different orders than the order described in conjunction with FIG. 8.

Initially, a beam of light is obtained 30 from a source, such as a laser. In some embodiments, the source is an array of semiconductor lasers, for example a vertical cavity surface emitting laser (VCSEL) array. The lasers in the array may be operated individually or in rows, and intensity of the beam of light in a dimension is varied 32 by varying intensities of lasers in different rows of the array to provide a cyclic variation in intensities between rows of the array.

An additional variation to the beam of light is provided 34 along an additional dimension. The additional variation may be a variation of intensity. For example, the additional variation is a series of notations, such as Gaussian peaks of intensity, along the additional dimension. The distribution of Gaussian intensity may vary along the dimension. For example, spacing between peaks of intensity may increase or decrease as distance from the source of the beam of light increases, the Gaussian spacing may be irregular, or positions of notations is shifted, as further described above in conjunction with FIG. 2. In some embodiments, a pre-stored pattern is used to identify individual stripes or other portions of a light pattern generated from the beam of light based on notations included in different stripes or other portions of the light pattern. The light pattern produced by varying 32 the intensity of the light along the dimension and providing 34 the additional variation to the light is then projected 36 the volume.

In one embodiment, an optical component producing the Gaussian intensity variations along the additional dimension has a regular shape but may have its angle offset to the dimension, so each stripe has Gaussian intensity variations that are slightly offset from each other. However, in other embodiments, any suitable configuration may be used to displace the Gaussian intensity variations relative to each other in different stripes, allowing each stripe to be individually identified.

In various embodiments, intensity of the beam of light is varied 32 in the dimension and the additional variation in the additional dimension is also provided 34. Other embodiments either vary 32 intensity of the beam of light in the dimension or provide 34 the additional variation in the additional dimension. For example, intensity of the beam of light is not varied 32 in the dimension, but provides 34 the additional variation in the additional dimension to include a unique signature for each stripe in the additional dimension. When each stripe includes a different signature from the additional variation in the additional dimension, a depth map may be directly provided from the unique signature of each stripe. Hence, providing unique notations for each stripe in the light pattern allows exact determination of depth of objects in the volume. An example of uniquely distributing notations to each stripe in the light pattern is further described below in conjunction with FIG. 15.

Alternatively, the intensity of the beam of light is varied 32 in the direction, but the additional variations in the additional dimension are not provided 34 to the beam of light. For example, a cycle of intensities is applied to different stripes to vary 32 the intensity in the direction. However, varying 32 intensity of the beam of light in the dimension without providing 34 the additional variations in the additional dimension results in multiple cycles of intensities of stripes, allowing each stripe to be indexed with respect to a cycle of intensities including the stripe rather than to be absolutely indexed. As shown in the example of FIG. 5C, when a relatively small number of stripes are projected onto an object of interest, indexing the stripes is difficult when the intensities of the stripes are varied 32 using a binary cycle.

In another embodiment, the intensity of the beam of light is varied 32 in the direction and the additional variations in the additional dimension are also provided 34 to the beam of light. For example, a cycle of intensities is applied to different stripes to vary 32 the intensity in the direction, while notations in stripes are shifted in the additional direction. The intensity variation and the shift in notations may each be cyclic, but having different periods, which allows unique identification of each stripe, at least to the precision of a larger cycle. If the indexing cycle is not sufficient, which prevents full indexing of each stripe, object segmentation also used to limit consideration to stripes within the object of interest. Additional accuracy may be obtained by comparing peak intensities of stripes with intensities of different stripes, as further described below.

Hence, the method described above in conjunction with FIG. 8 produces a light pattern where intensity of a beam of light varies in a direction and also additionally varies in an additional direction. The method further described above in conjunction with FIG. 4 may be used in various embodiments to vary intensity of the beam of light in the direction to allow indexing of each stripe in the light pattern.

Figure 9:
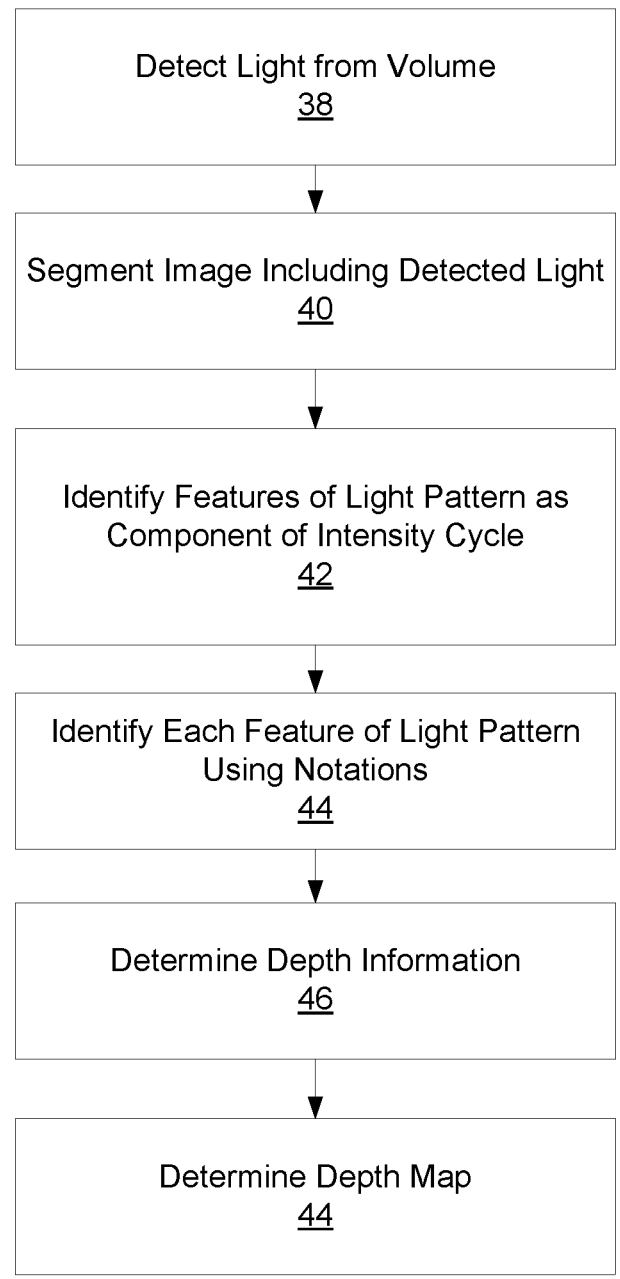
FIG. 9 is a flowchart of a method for obtaining a three-dimensional depth map from a light pattern, according to an embodiment.

FIG. 9 is a flowchart of an embodiment of a method for obtaining a three-dimensional depth map of an object of interest from a light pattern. In some embodiments, the method may include additional steps than those described in conjunction with FIG. 9. Additionally, in some embodiments, the method may perform the steps in different orders than the order described in conjunction with FIG. 9.

A light sensor, such as a camera, detects 38 light from a volume. In some embodiments, multiple cameras or light sensors detect 38 light from the volume. Alternatively, a single camera or light sensors detect 38 light from the volume.

In some embodiments, an image including the detected light is segmented 40 to identify the object of interest from objects in the volume. Segmenting 40 to identify the objects of interest allows for relative indexing, where depths are obtained relative to other portions of the object of interest. Variations in intensity between different stripes in the light pattern are used to identify 42 each stripe as a particular component of one of the intensity cycles in some embodiments. However, variations in intensity between stripes in the light pattern do not allow unique identification of a stripe, so each stripe is identified 44 using notations included in different stripes as well as the relative indexing to allow identification of individual strips (i.e., absolute indexing of each stripe). For example, absolute indexing of each stripe is based on intensities of notations in different stripes.

Absolute indexing of the stripes allows determination of a depth from the actual position of each stripe in an image of the detected light from the volume. Depth information is further determined 46 based on spacing between notations or intensity rations between intensity of a stripe and a peak brightness of a notation in the stripe to more accurately determine depth information based on stripe positions. Based on depth information for various points in the volume (e.g., various points of the object of interest), a depth map of the volume is determined 48, allowing three-dimensional movement of objects of interest (e.g., hands) within the volume to be traced. Hence, the depth map may be used to recognize gestures within the volume; for example, gestures recognized in part using the depth map correspond to commands for interfacing with a device, such as a computer or a virtual reality system.

Figure 10:
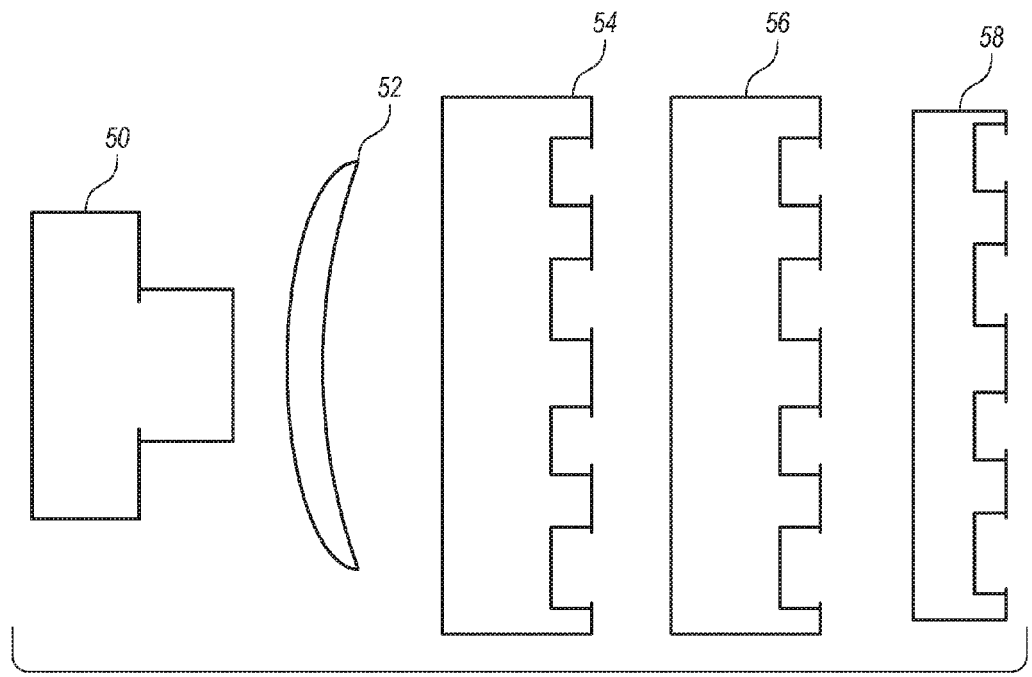
FIG. 10 is an example arrangement of optical components for producing a light pattern, in accordance with an embodiment.

FIG. 10 is a conceptual diagram of an example series of elements for generating a light pattern for projection. For purposes of illustration, FIG. 10 shows the elements in a side view. A light source 50, such as an array of lasers, provides a beam of light to a collimator 52, which collimates the beam of light. The collimated beam of light is directed to an optical element 54, which may be a diffractive optical element or any other suitable optical element, produces stripes in the collimated beam of light. The light is directed from the optical element 54 to an additional optical element 56, which may also be a diffractive element or any other suitable optical element. The additional optical element 56 superimposes Gaussian peaks of intensity onto the stripes. In various embodiments, the additional optical element 56 is slightly offset with respect to the optical element 54 so peaks of intensity are produced at different positions in different stripes. Thus, the additional optical element 54 may cyclically shift the notations on different stripe as further described below in conjunction with FIG. 13. A duplicator 58 causes repetition of the pattern produced by the optical element 54 and the additional optical element 56.

In some embodiments, the light source 50 comprises rows of lasers that are individually controllable so as to produce different intensities. As further discussed above, intensity of a stripe diminishes as the distance from the light source 50 increases (i.e., the intensity is proportional to 1/z, where z is the distance from the light source 50). However, the peak intensity within a stripe is remains constant as distance from the light source 50 increases, so a ratio between a peak intensity of a stripe and the average intensity of the stripe intensity provides an estimate of the depth of the stripe.

The collimator 52, the optical element 54, and the additional optical element 56 may be in different orders than the order shown in FIG. 10 in various embodiments. For example, the output of the collimator 50 is initially directed to the additional optical element 54 to provide Gaussian peaks of intensity, and the output of the additional optical element 54 is directed to the optical element 52 to generate stripes. Additionally, in some embodiments, elements comprising a combination of the collimator 52, the optical element 54, and the additional optical element 56 may be used rather than the individual components.

Figure 11:
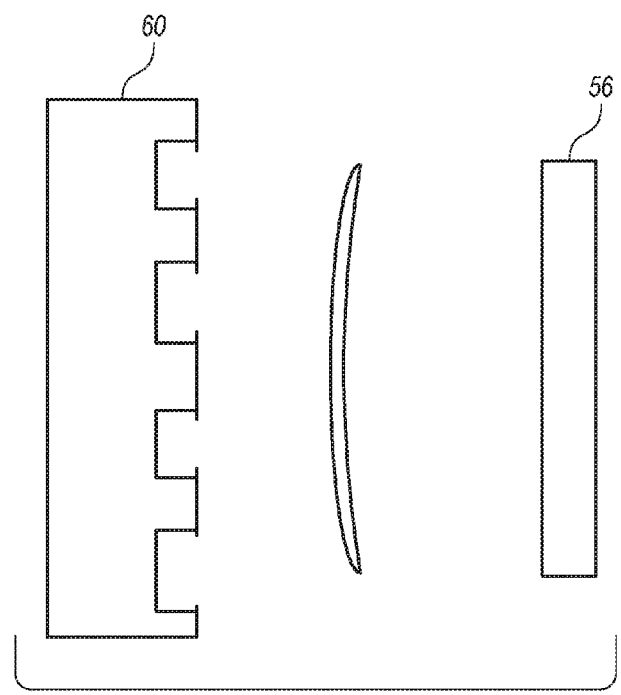
FIG. 11 is an example of an alternative arrangement of optical components for producing a light pattern, in accordance with an embodiment.

FIG. 11 is an alternative configuration of elements for generating a light pattern. For purposes of illustration, FIG. 11 shows an overhead view of the configuration of elements. In the example of FIG. 11, an element 60 comprises a multi-emitter light source and an optical element configured to produce stripes in light from the multi-emitter light source. A Collimator 62 is positioned after the element 60, and collimated light from the collimator 62 is directed to an additional optical element 56, which superimposes Gaussian peaks of intensity onto the stripes produced by the element 60, as further described above. Hence, optical elements may be combined or separated or may have different orders relative to each other in various embodiments.

Figure 12:
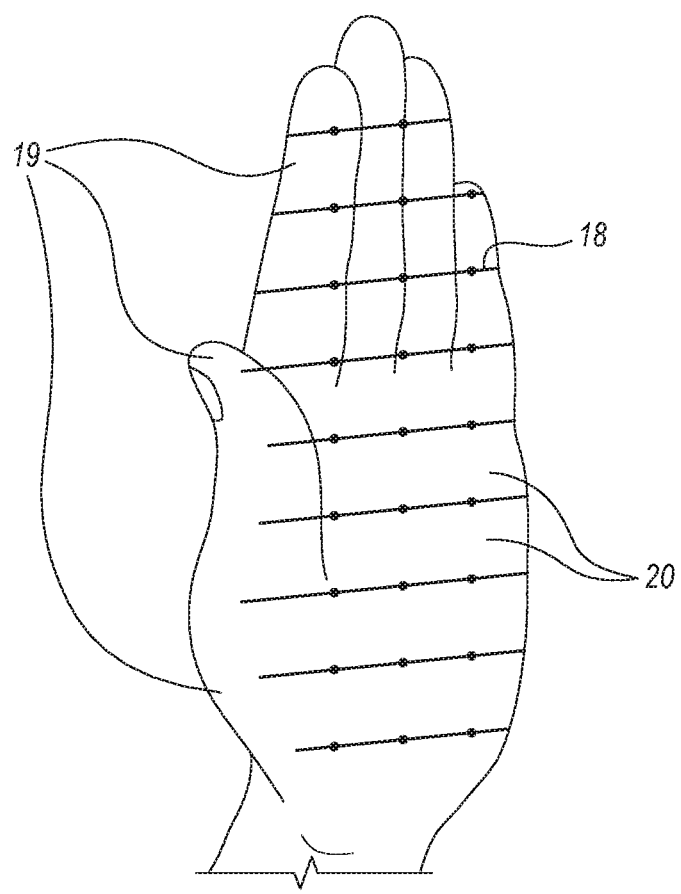
FIG. 12 is a conceptual diagram of example notations added to a stripe feature of a light pattern, in accordance with an embodiment.

FIG. 12 is a conceptual diagram of example notations added to a stripe feature of a light pattern. The light pattern shown in FIG. 12 may be generated via elements configured as described above in conjunction with FIGS. 10 and 11. For purposes of illustration, FIG. 12 shows the light pattern projected onto a hand 18. The light pattern comprises stripes 19, with each stripe 19 comprising spaced notations 20. In the example of FIG. 12, the notations 20 are regularly located with a constant shift between the notations 20, which may be caused by angular shifting of optical elements producing the light pattern relative to each other. For example, notations 20 are Gaussian intensity distributions having peak intensities at the centers of the distributions. In other embodiments, the notations 20 are irregularly spaced.

Using the light pattern described in conjunction with FIG. 12, edges of the hand 18 are identified as locations where there is a discontinuity in the light pattern. Segmentation, or finding the outline of an object, is based on identifying the discontinuity in the light pattern, and is further described in U.S. patent application Ser. No. 13/497,589, filed on Sep. 19, 2010, which is hereby incorporated by reference in its entirety.

A depth may be obtained by determining locations of individual stripes in the light pattern, allowing monitoring of a three-dimensional shape of an object relies on determining the locations of individual stripes and therefrom obtaining a depth. Determining depths from different stripes in the light pattern allows generation of a depth map that allows identification of movement of the object for identifying one or more gestures of the object. For example, at locations where a surface of the object curves, the stripes 19 also appear to curve. Similarly, at locations where the surface of the object recedes, the stripes 19 tend towards a vanishing point. These behaviors of the stripes 19 allow generation of the depth map by identifying individual stripes 19. As shown in FIG. 12, when the notations 20 on each stripe 19 are slightly shifted relative to other stripes 19, individual stripes 19 may be identified from the notations 20, allowing depth at different locations to be determined from shifting of an individual stripe 19 towards a vanishing point. A relative depth map may be generated from segmenting the object, and an absolute depth may be generated from the depth of each stripe by indexing each line in an image including the light pattern and the object. In more detail, the light pattern comprises multiple of stripes 19 each extending in a dimension, with different stripes 19 having different intensities in an additional dimension. Intensity of a stripe 19 may vary based on a distribution of uniform peak intensities along the stripe 19, which may be superimposed on the stripe 19. The peak intensity of a stripe 19 may be the peak of a Gaussian intensity distribution that provides a notation 20 on the stripe 19, and thus provide a notation along each stripe.

To locate the object, such as the hand 18 in FIG. 12, within a volume, segmentation of one or more images of the volume is performed and used to identify an object of interest. As further discussed above, relative depth within the object of interest may be obtained. In an embodiment, a further depth calculation is obtained from the distance between the notations 20. Additional depth calculation may be determined based on a ratio between a local value of intensity of a stripe 19 and a locally measured peak intensity of a notation 20 within the stripe 19. Further depth calculation may be based on the distance between stripes 19.

Variations in an intensity of a stripe 19 and a peak intensity of a notation 20 in the stripe 19 each have a unique function for intensity alteration based on distance from a light source. While the intensity of a stripe 19 degrades linearly as distance from a source of the light pattern including the stripe 19 increases, measured peak intensity of each notation 20 in the stripe 19 remains constant. The distance to an object reflecting the light pattern to a sensor, such as a camera, may be extracted from a ratio of the peak intensity of a notation 20 to an intensity of a stripe 19 including the notation 20. Although the absolute reflected intensity of a stripe 19 depends on a surface of the object reflecting the strip 19, the ratio between a peak intensity of a notation 20 in the stripe and an intensity of the stripe 19 may generally be preserved.

Multiple phase functions differently propagating over distance from a light source causes multiple intensity functions that vary with distance from the light source, creating different intensity ratios over different range of distance from the light source. Embodiments previously discussed above include a function creating the stripe features and an additional function creating the Gaussian intensity peaks along the stripes. Generally, intensity of light reflected from an object degrades at a rate of $1/z^2$, where z is a distance from the object to the light source emitting the light, as the reflected light spreads as a sphere back to the sensor. However, a stripe feature is collimated in a single axis and because the physical coverage of each pixel in the sensor is angular, the collimated stripe is viewed by fewer pixels on the sensor, increasing brightness of the stripe. Hence, the intensity of a stripe degrades at a rate of $z/z^2$, or $1/z$, where z is the distance from the object to the light source from which the stripe is emitted.

Using diffractive optics, the additional function creating the intensity peaks along the strips may be created using an independent phase function allowing the intensity peaks to comprise radially collimated Gaussians. Because of radial collimation, a number of pixels sampling the Gaussian throughout the distance between the object and the light source is reduced in both horizontal and vertical axes, resulting in an intensity at a location of an intensity peak of $z^2/z^2$, where z is the distance from the object to the light source from which the stripe is emitted, which is a constant. The ratio of the intensity of each intensity peak to the overall intensity of a stripe including an intensity peak changes as the distance of an object reflecting the stripe and a light source emitting the stripe changes because the overall intensity of the stripe varies according to a factor of $1/z$, where z is the distance from the object to the light source from which the stripe is emitted, while the intensity peak remains constant.

Referring now to FIG. 13, a hand 70 is shown with horizontal coordinates, vertical coordinates, and depth coordinates. As the hand moves vertically or relative to a position of a light source, edges of the hand 70 move along or across the grain of stripes in a light pattern projected onto the hand. The light pattern is transmitted by a beam source 72 and received at a camera 74, or another sensor. In FIG. 13, an image 76 shows the stripes in the light pattern and another image 78 shows an example misalignment of the notations along succeeding lines. Thus, the camera 74 follows the horizontal and vertical movement of the hand, and the distance between the stripes and notations and the intensity ratios of peak intensity of a notation in a stripe and intensity of the strip remain unchanged.

Figure 14A:
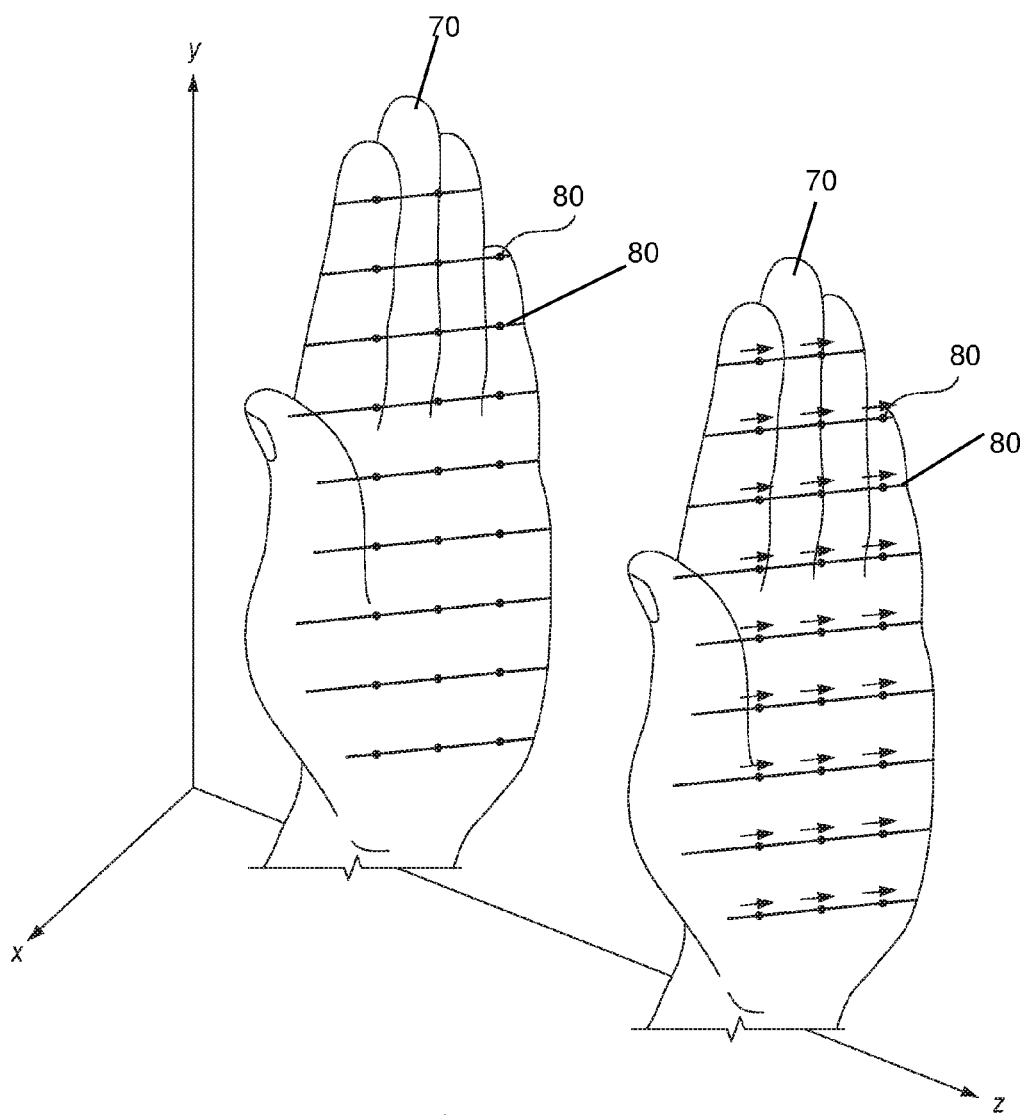
FIG. 14A is an example intensity diagram for a series of notations on stripes of a light pattern, in accordance with an embodiment.
Figure 14B:
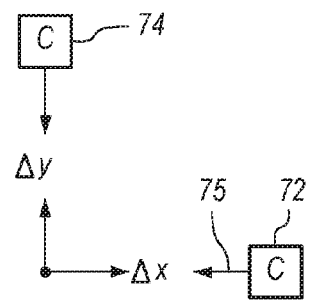
FIG. 14B is a conceptual diagram illustrating movement of a detector to obtain additional depth information, in accordance with an embodiment.

FIG. 14A is a conceptual diagram of obtaining depth information from movement of notations 80 in a light pattern. For example, distance between the hand 70 and a sensor capturing light from the light pattern reflected by the hand 70, causing positions of the notations 80 to shift as shown by the arrows in FIG. 14A. If the hand 70 moves away from sensor, the notations 80 shift towards a vanishing point for stripes in the light pattern. However, if the hand 70 moves towards the sensor, the notations 80 shift away from the vanishing point for stripes in the light pattern. Alternatively, as shown in FIG. 14B, the notations 80 may shift when the hand 70 remains stationary and the sensor or a light source emitting the light pattern is repositioned relative to the hand 70. For example, the source 72 is repositioned along axis 75 relative to the camera 74 in the example of FIG. 14B, while the hand 70 remains stationary, causing shifting of the notations 80 as shown in FIG. 14A.

Figure 15:
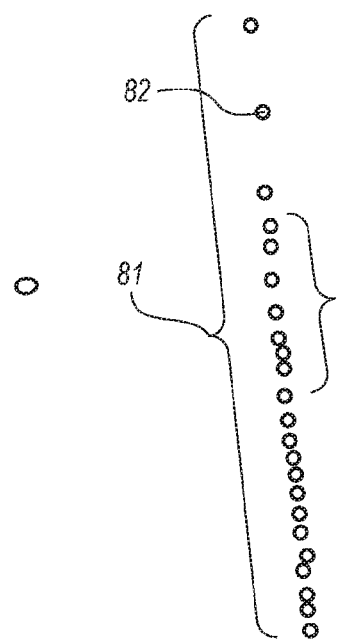
FIG. 15 is a conceptual diagram of a series of irregularly spaced notations on a stripe of a light pattern, in accordance with an embodiment.

FIG. 15 is a conceptual diagram showing an irregular distribution of notations 82 in a stripe 81. In the example of FIG. 15, notations proximate 82 to one end of the stripe 81 are widely spaced, and spacing between notations 82 decreases as distance from the end of stripe 81 increases.

Figure 16:
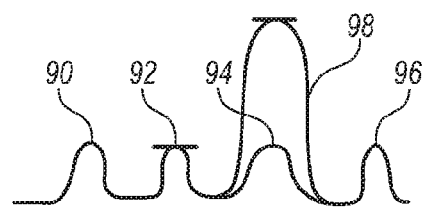
FIG. 16 is a conceptual diagram of varying brightness levels in adjacent stripes in a light pattern, in accordance with an embodiment.

Reference is now made to FIG. 16, is a conceptual diagram of an example of varying brightness levels in adjacent strips in a light pattern. In some embodiments, the example shown in FIG. 16 is produced by a line generator followed by an amplifier operating on certain stripes and not on other stripes. The line generator produces stripes 90, 92, 94, and 96 that are evenly distributed and have an even intensity. Subsequently, an amplifier element amplifies line 94 to an increased intensity 98, so line 94 has an increased intensity relative to stripes 90, 92, and 96, providing the pattern of stripes having a unique signature.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
projecting a structured light pattern into a volume, the structured light pattern comprising a predefined structure comprising striping extending in a dimension having a plurality of features, each feature comprising a predefined variation along the dimension comprising a cycle of intensities in an additional dimension, each stripe of a group of stripes in the cycle projected with a respective intensity, the predefined structure further comprising an intensity variation along each of the stripes so peak intensities of different stripes are in different locations relative to each other, and the structured light pattern further comprises an additional variation across an additional dimension, the additional variation also varying along the dimension;
detecting light reflected from one or more objects in the volume, the detected light including one or more of the features of the predefined structure of the structured light pattern;
correlating the one or more features in the detected light with the predefined structure; and
determining depth information for objects based on the locations of peak intensities of different stripes.

2. The method of claim 1, wherein determining depth information for objects associated with each of the one more features in the detected light based on the correlation comprises:
comparing said at least some features in the detected light with corresponding positions in a detection image including objects included in the volume to obtain depth information for objects associated with the one or more features in the detected light based on the correlating.

3. The method of claim 1, wherein the depth information for an object comprises three-dimensional depth information for the object.

4. The method of claim 1, wherein the one or more features of the predefined structure of the structured light pattern are orthogonally indexed.

5. The method of claim 1, wherein the one or more features of the predefined structure of the structured light pattern comprise intensity levels.

6. The method of claim 1, wherein the variation or the additional variation comprises a cyclical intensity variation.

7. The method of claim 6, wherein the cyclical intensity is selected from a group consisting of: a binary variation, a three-level variation, a four level variation, a five level variation, a six level variation, a seven level variation, and an eight level variation.

8. The method of claim 1, wherein the variation comprises a distribution of uniform peak intensities varying along the dimension.

9. The method of claim 1, wherein determining depth information for objects associated with each of the one more features in the detected light based on the correlating comprises:
calculating depth information for an object associated with a feature in the detected light based on a ratio between a value of an intensity of the feature from the predefined feature and a peak intensity of the additional second variation within the feature.

10. The method of claim 1, wherein determining depth information for objects associated with each of the one more features in the detected light based on the correlating comprises:
determining a relative index of the stripes relative to the cycle of intensities; and
determining the depth information for the objects based on the relative index.

11. The method of claim 1, wherein determining depth information for objects associated with each of the one more features in the detected light based on the correlating comprises:
determining a relative index of the stripes relative to the cycle of intensities; and
determining the depth information for the objects based on the relative index and the locations of peak intensities of different stripes.

12. A method comprising:
projecting a light pattern into a volume, the light pattern comprising a cyclical intensity variation in a dimension and a distribution of uniform peak intensities along an additional dimension, the distribution along the additional dimension also varying with the dimension;
finding a location in said volume that reflects the light pattern;
determining a ratio between an intensity at the location according to the cyclical intensity variation and an intensity at the location according to the distribution of uniform peak intensities;
determining a depth at the location using the determined ratio.

13. The method of claim 12, wherein the light pattern comprises stripes extending in the additional dimension.

14. The method of claim 13, wherein the cyclical intensity variation comprises projecting each stripe of a group of stripes with a different intensity and repeating the different intensities for at least an additional group of stripes.

15. The method of claim 14, wherein the distribution of uniform peak intensities along the additional dimension comprises Gaussian variations in intensity along the stripes having peak intensities.

16. The method of claim 14, wherein determining the depth at the location using the determined ratio comprises:
determining a relative index of the stripes relative to the cyclical intensity variation using object segmentation; and
determining the depth at the location based on the relative index and locations of the peak intensities in one or more stripes, as well as the determined ratio.

17. An apparatus comprising:
a light source configured to vary in intensity in a direction to produce a light beam having stripes extending in a dimension having a cycle of intensities in an additional dimension orthogonal to the direction of the light beam features of varying intensities; and
an optical element configured to apply intensity features in a direction orthogonal to the direction to the light beam, generating a light pattern comprising a cyclical intensity variation in a dimension and a distribution of uniform peak intensities along the additional dimension orthogonal to the direction of the light beam, the distribution along the additional dimension also varying with the dimension.

18. The apparatus of claim 17, further comprising:
an additional optical element configured to apply additional intensity features to the light beam that overly the intensity features applied by the optical element, the additional intensity features applied in a grid layout, the additional optical element offset with respect to the direction to cause said the additional intensity features to be at different locations in each feature.

* * * * *

UNITED STATES PATENT AND TRADEMARK OFFICE
CERTIFICATE OF CORRECTION

PATENT NO. : 9,934,574 B2
APPLICATION NO. : 15/052659
DATED : April 3, 2018
INVENTOR(S) : Nadav Grossinger et al.

Page 1 of 1

It is certified that error appears in the above-identified patent and that said Letters Patent is hereby corrected as shown below:

In the Claims

Column 17, Line 40, after "one" insert -- or --.
Column 18, Line 2, after "one" insert -- or --.
Column 18, Line 11, after "one" insert -- or --.
Column 18, Line 19, after "one" insert -- or --.
Column 19, Line 8, after "that" delete "overly" and insert -- overlay --.

Signed and Sealed this
Nineteenth Day of February, 2019

Andrei Iancu
*Director of the United States Patent and Trademark Office*